April 14, 1953 P. T. GARDNER 2,634,771
SABER SAW
Filed Aug. 23, 1949 2 SHEETS—SHEET 1
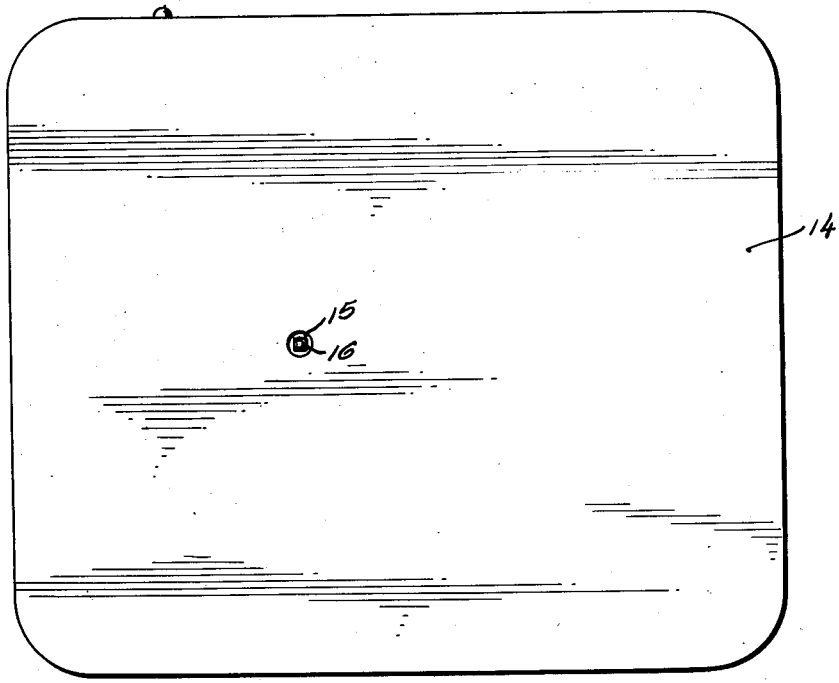
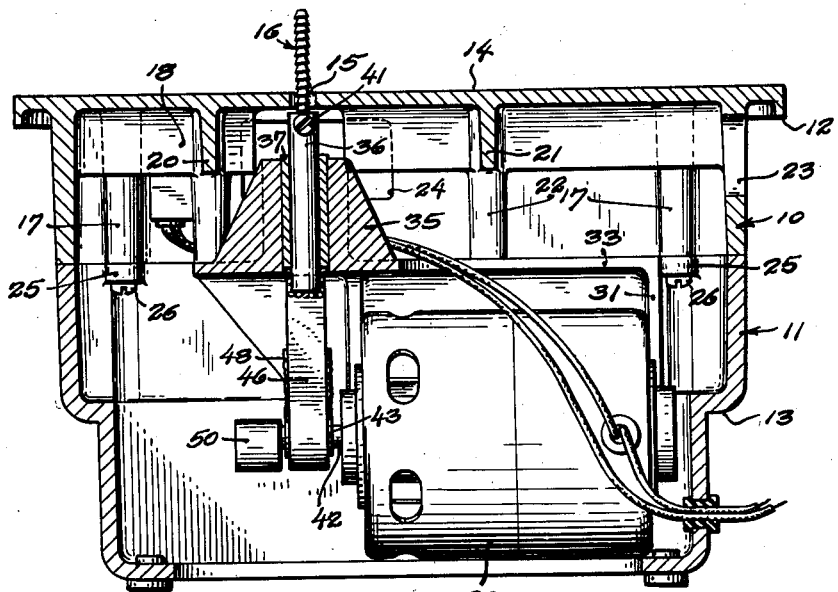
INVENTOR.
Philip T. Gardner April 14, 1953 P. T. GARDNER 2,634,771
SABER SAW
Filed Aug. 23, 1949 2 SHEETS—SHEET 2

INVENTOR.
Philip T. Gardner
BY
Edward E. Barnes
atty.

Patented Apr. 14, 1953

2,634,771

UNITED STATES PATENT OFFICE 2,634,771

SABER SAW

Philip T. Gardner, Seattle, Wash.

Application August 23, 1949, Serial No. 111,835

3 Claims. (Cl. 143—72)

This invention relates to a power saber saw, and which is to say that type of saw in which the blade partakes of reciprocatory movement but is guidably supported only at its lower end, leaving the upper end of the blade free and consequently permitting the table on which the work is supported to be entirely unobstructed. Saws of this type have rather a wide range of usefulness and can operate satisfactorily on fairly heavy stock but they are almost a specific for model makers in cutting out the structural pieces, most usually of balsa wood, used by model makers in producing small-scale replicas of airplanes, vessels and the like.

As its general object, the invention aims to provide a sturdy and compact power saber saw utilizing an electric motor as the source of power and having the motor unit and all moving parts other than the saw blade's cutting end completely housed.

It is a further and important object to devise a saber saw in which the housing is so made as to give an unusually attractive modernized appearance and with the work-supporting table made an integral immovable part of the housing structure.

As a further object still, the invention aims to provide a housing structure composed of two parts, each a relatively inexpensive casting, utilizing concealed screws for the connection thereof and so engineered as to admit of these screws being easily and quickly removed should any occasion arise for dismantling the housing.

The invention has the yet further and particular object of devising a saber saw introducing, as the connection between the motor and the saw blade, a perfected type of eccentric drive characterized in that the pitman arm is made flexible and admits of being rigidly connected by its outer end to the reciprocally mounted member which guidably supports the saw-blade, providing an especially inexpensive drive connection and one which has the important advantage of eliminating any need for a wrist-pin with the consequent necessity of lubricating the same.

It is a further and important object still, and one the attainment of which is made possible through the use of my said flexible pitman arm, to provide an unusually simple means of lubricating the eccentric proper in a manner giving very nearly the efficiency of a pressure system albeit using for the purpose a substantial counterpart of the commonly employed wiping wick.

Other and still more particular objects, together with the foregoing, will appear and be understood in the course of the following description and claims, the invention consisting in the novel construction and in the adaptation and combination of parts hereinafter described and claimed.

In the accompanying drawings:

Figure 1 is a top plan view illustrating a power saber saw constructed in accordance with the preferred embodiment of the present invention.

Fig. 2 is a longitudinal vertical sectional view thereof taken on the approximate longitudinal median line of the saw.

Figure 3:
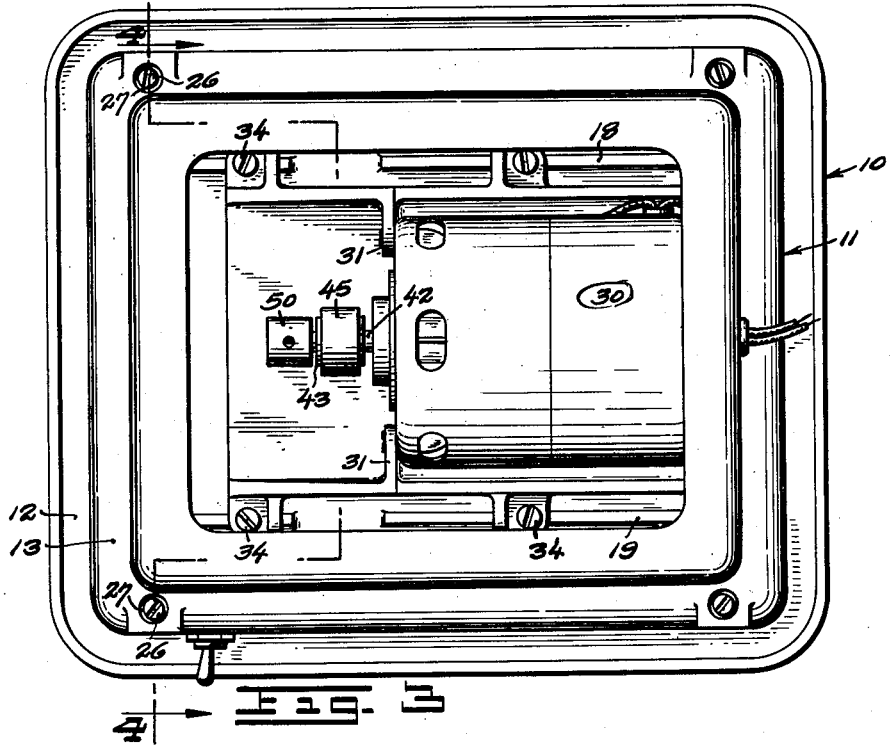
Fig. 3 is an underside plan view of my improved saw.

The housing of the present invention, comprised by preference of two boltably interconnected chambered parts 10 and 11, each preferably composed of a metal casting, is desirably of rectangular plan configuration and, elevationally considered, has substantially straight sides relieved at the head end and at a point intermediate the height by out-jutting shoulders 12 and 13, respectively. For symmetrical design in keeping with the modern trend of such cantilever-type architecture, greater height is given to the second than to the bottom story of the two offset wall sections, and the cornice-like projection which lies at the top has comparatively little depth.

In producing the two housing sections, the head part 10 is open to the bottom and closed at the top, and has the exposed surface 14 of the top wall faced down to serve as a flat table for the saw. Other than for a vertical opening 15 to accommodate the saw-blade 16, and which lies substantially on the longitudinally median line of the top somewhat offset from the transverse median line, this table is uninterrupted throughout its entire area. Within the chamber of such upper housing part, and spaced about the perimeter, there are provided a number of vertical lugs 17 each tapped from the underside, and for reinforcing the table top there are also provided two longitudinal ceiling ribs 18 and 19 intersected by two transverse ceiling ribs 20 and 21. These four ribs bound an area containing the table opening 15 and presented at the several points of intersection are pendant posts 22. Provided in the end wall of said top casting which lies opposite the blade opening 15 is a vent opening 23, and provided in each of the side walls in transverse alignment with said blade opening is an access opening 24.

The lower or base part 11 of the two housing sections is made somewhat deeper than the head section, is open to the top and bottom, and along its upper edge about the inner perimeter presents vertically bored lugs 25 placed to register with the lugs 17 of the superposed upper casting. Screws 26 by which the two cast members are bolted together work in the internal threads of lugs 17 and take their purchase against the sister lugs 25, and for convenient introduction of a screw-driver to apply or remove these screws the shoulder 13 which produces the lower of the housing's two out-juttings is pierced with openings 27 each vertically aligned with a respective said screw-hole.

The electric motor of the present invention, designated by 30, is housed within the chamber formed by the lower of said casting members and derives its support from four pendant legs 31 presented by a mounting bracket, this bracket bearing by a head plate 33 against the underside of the posts 22 and being secured thereto by screws 34. Such bracket has an upstanding center-bored boss 35 surmounting the head-plate and so located as to dispose the bore substantially in axial alignment with the table opening 15. An oil-impregnated lining sleeve 37 is set into this through-bore and slidably journaled for vertical reciprocatory movement in the lining sleeve is a cylindrical guide 36 for the saw-blade. The saw-blade which I employ is desirably of the type devised by Alvin Norquist and illustrated and described in the latter's pending application for Letters Patent of the United States filed October 20, 1947, Ser. No. 780,945, and namely a blade produced from a length of sectionally square rod stock with buttress-type teeth cut transverse to each of the four side faces. The butt 38 of the saw-blade fits in a mating socket 40 presented by the guide and is detachably secured by a set screw 41.

Figure 4:
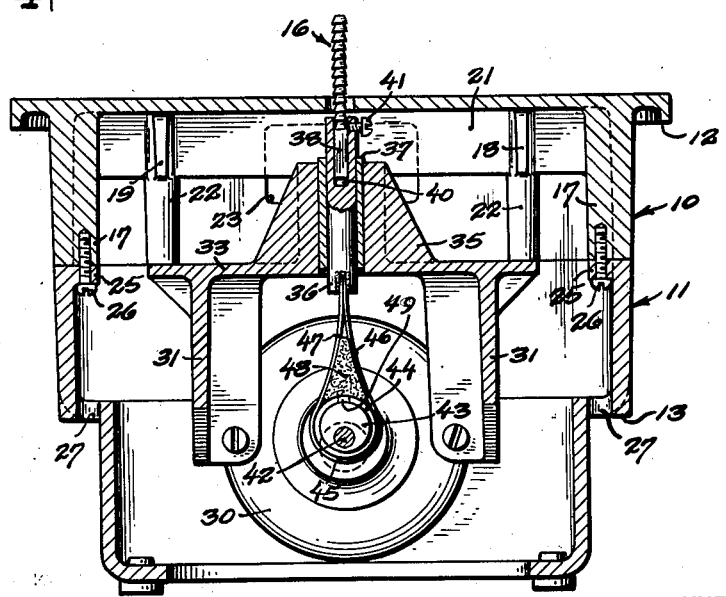
Fig. 4 is a transverse vertical sectional view on broken line 4—4 of Fig. 3.

As a power transfer from the armature shaft 42 of the motor giving reciprocatory motion to the guide 36, there is fixed to said armature shaft an eccentric sheave 43. Journaled on this sheave is the usual complement of a sleeve 44, and brazed or otherwise integrated with the sleeve and connecting by its other end with the guide is a pitman. In making this pitman I employ a flexible strip, preferably of brass, brought back upon itself with the produced bight 45 encircling somewhat more than a half of the sleeve's perimeter and with two limbs 46 and 47 converging inwardly on incurved lines and coming into contiguity at the free ends, these contiguous ends fitting in a cross-slot of the guide and being soldered to the latter. Lubrication of the sleeve 44 is accomplished by gripping a pad 48 of oil-saturated wicking between the triangular throat which occurs between said two converging limbs 46 and 47, the sleeve having an oil duct 49, shown by dotted lines in Fig. 4, fed from this pad and leading to the bearing surface of the sheave.

The armature shaft of the motor desirably is fitted upon its extereme end with a balance wheel 50 countering the offset weight of the eccentric sheave. In driving the guide 36 it will be self-evident that the two limbs of the pitman each partake of a flexing action, alternately straightening out and bending as the bight rocks about the axis of the armature shaft as a center. This flexing operates upon the oil-saturated pad much in the nature of a pump and serves to effectively deliver minor quantums of oil to the surface of the sleeve upon each revolution of the eccentric.

The structural details and manner of operation of the invention will, it is thought, be clearly understood from the foregoing. Minor changes will largely suggest themselves and may be adopted without departing from the spirit of the invention and it is accordingly my intention that no limitations be implied and that the hereto annexed claims be read with the broadest interpretation which the employed language fairly permits.

What I claim is:

1. In a saber saw: a housing producing a chamber open to the bottom and substantially closed about the sides and top with the top made flat of one piece and serving as a work table, said table being uninterrupted throughout its areal extent other than for an opening to accommodate a saw blade, a plurality of posts depending from the top wall of the chamber and located at the four corners of a rectangle inscribed within the housing; a bracket formed to provide depending legs and a surmounting center-bored boss integrated with a median plate and detachably secured within the chamber to have the corners of the plate bear against the underside of the posts with the boss in vertical alignment with the blade opening; a guide for a saw blade journaled for reciprocatory sliding movement in the bore of said boss; an electric motor hung by said legs to locate an exposed end of its armature shaft directly below the boss; and a driving connection from said shaft end to the guide for reciprocating the latter.

2. The saber saw of claim 1 in which said driving connection comprises an eccentric sheave fixed to the armature shaft, a sleeve complement for the sheave, and a spring-metal strap bent upon itself with the produced bight encircling a portion of the sleeve and having the two branches converging and connecting by the free ends with the guide.

3. The saber saw of claim 2 in which said sleeve is drilled to provide an oil duct, and an oil-impregnated body of wicking held between said converging branches of the spring-metal strap in contact with the drilled surface of the sleeve.

PHILIP T. GARDNER.

References Cited in the file of this patent

UNITED STATES PATENTS

| Number | Name | Date |
|---|---|---|
| 35,391 | Richards | May 27, 1862 |
| 976,801 | Henderson | Nov. 22, 1910 |
| 1,147,266 | Rapsch | July 20, 1915 |
| 1,198,887 | Bruce | Sept. 19, 1916 |
| 1,502,088 | Colby | July 22, 1924 |
| 1,695,776 | Nemec | Dec. 18, 1928 |
| 1,726,863 | Singer | Sept. 3, 1929 |
| 1,729,324 | Bates | Sept. 24, 1929 |
| 1,799,215 | Colby | Apr. 7, 1931 |
| 1,974,642 | Colby | Sept. 25, 1934 |
| 2,131,492 | Ocenasek | Sept. 27, 1938 |
| 2,327,239 | Bartlett | Aug. 17, 1943 |
| 2,424,532 | Beard | July 22, 1947 |